Figure 5:
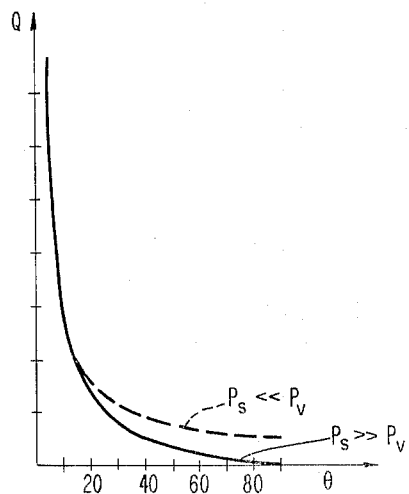

Dec. 7, 1965     S. HOLLY     3,222,615
CYLINDRICAL LASERS UTILIZING INTERNAL REFLECTION TECHNIQUES
Filed Oct. 10, 1961     4 Sheets-Sheet 1
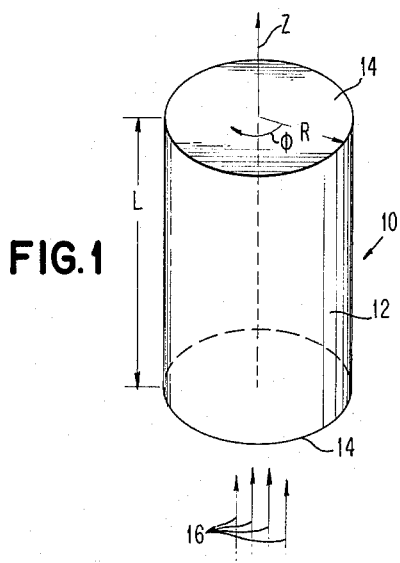
FIG. 1
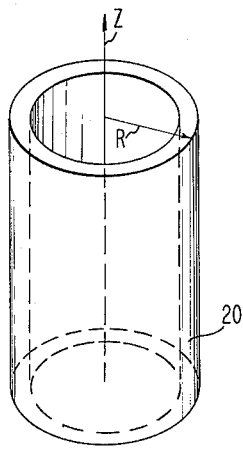
FIG. 2
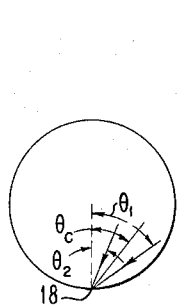
FIG. 1a
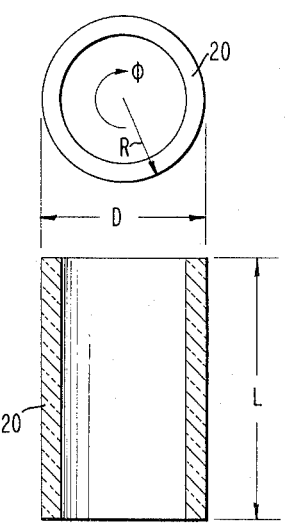
FIG. 2a
FIG. 2b
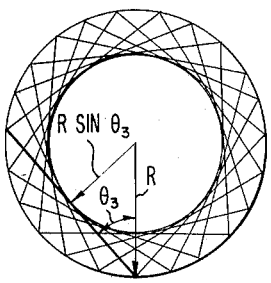
FIG. 3
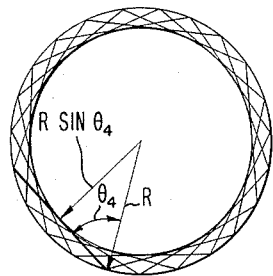
FIG. 4
INVENTOR
SANDOR HOLLY
BY Stephen J. Limanek
ATTORNEY

United States Patent Office 3,222,615
Patented Dec. 7, 1965

3,222,615
CYLINDRICAL LASERS UTILIZING INTERNAL
REFLECTION TECHNIQUES
Sandor Holly, Briarcliff Manor, N.Y., assignor to International Business Machines Corporation, New York, N.Y., a corporation of New York
Filed Oct. 10, 1961, Ser. No. 144,080
4 Claims. (Cl. 331—94.5)

This invention relates to improved optical masers or lasers and more particularly to improved active elements in optical masers or lasers.

The terms "optical maser" and "laser" are intended to be synonymous terms and are used to describe devices which by stimulated emission produce radiation in the infrared visible or ultraviolet portions of the electromagnetic wave spectrum. The word "maser" is an acronym for microwave amplification by stimulated emission of radiation. When similar techniques are employed to produce waves within the optical region of the electromagnetic wave spectrum, the terms optical maser and laser are used, "laser" being an acronym for light amplification by stimulated emission of radiation. Optical devices of this type are capable of producing radiation which is highly directional, coherent and monochromatic.

In recent years a large amount of research and development has been expended in attempting to develop lasers and masers as indicated by the following patents and publications.

U.S. Patents 2,836,722, "Atomic or Molecular Oscillator Circuit" and 2,929,922, "Masers and Maser Communications System."
Physical Review, vol. 112, page 1940, December 1958, "Infrared and Optical Masers."
Nature, vol. 187, page 493, August 1960, "Stimulated Optical Radiation in Ruby."
British Communications and Electronics, vol. 7, page 674, 1960, "Optical Maser Action in Ruby."
Physical Review Letters, vol. 5, page 303, October 1960, "Coherence, Narrowing, Directionality, and Relaxation Oscillations in the Light Emission from Ruby."
Physical Review Letters, vol. 5, page 557, December 15, 1960, "Stimulated Infrared Emission from Trivalent Uranium."
IBM Journal of Research and Development, vol. 5, page 56, 1961, "Solid State Optical Maser Using Divalent Samarium in Calcium Fluoride."

The last five articles listed hereinabove relate to solid state lasers, that is lasers which have as their active element a crystal containing a suitable doping material wherein electromagnetic oscillations are produced. It should be understood that the active element of a solid state laser is sometimes referred to as the cavity or resonator of the laser. The earliest known solid state laser is the so-called ruby laser which has an active element fabricated of aluminum oxide doped with chromium. The ruby laser produces an output radiation in pulse form which is in the red area of the visible portion of the electromagnetic wave spectrum. An optical laser having an active element fabricated of a crystal of calcium fluoride doped with divalent samarium produces an output radiation which is also in the red area of the visible spectrum. More recently other solid state lasers, for example, a laser having a barium titanate crystal doped with trivalent uranium have been produced.

The chromium atoms present in the active element of the ruby laser which provide the stimulated emission have predominantly three different energy states that is, a ground state, a metastable state and an excitation state. The trivalent uranium and divalent samarium atoms present in the active elements of the calcium fluoride laser have predominantly four energy states that is, a ground state, an excitation state, a metastable state and a terminating state. In the three energy level active elements fluorescence occurs between the metastable state and the ground state whereas in the four energy level active elements fluorescence occurs between the metastable state and the terminating state which is somewhat above the ground state. When radiation energy is applied to one or more surfaces of the active elements of the lasers the atoms are pumped from the ground state to the excitation state. The atoms in the excitation state undergo a non-radiative transition when passing from the excitation state to the metastable state. Fluorescent transition is then produced by stimulated emission between the metastable state and the ground state in the three energy level active elements and between the metastable state and the terminating state in the four energy level active elements. When the laser is in a quiescent state, that is, when pumping power is not applied to the active element the population of the various states in the active element is such that almost all of the atoms in the material are in the ground state. As is known, in order to produce the desired stimulated emission and resulting oscillation to realize the high intensity coherent output it is necessary to supply sufficient pumping energy to the active element to achieve a population inversion between the two states between which the fluorescent transition is produced in the active element. When the fluorescent transition is produced between the metastable state and the ground state it is necessary that a very large number, that is, more than half, of the active atoms initially present in the ground state be pumped into the excitation state. These excited atoms then relax to the metastable state before fluorescence is produced. In the four energy level active element of the laser the terminating state is normally essentially depopulated. As a result of the sparse population in the terminating state only a relatively small number of atoms need be pumped to the excitation state and leak back to the metastable state in order to achieve a population inversion between the metastable state and the terminating state. Accordingly, it has been found that only about $\frac{1}{500}$ of the pumping power necessary to provide oscillations in the three energy level active element is required to provide oscillations in the four energy level active elements. Since considerably less pumping power is necessary to provide oscillations in the four energy level active element it has been found that continuous wave operation is possible in the solid state lasers using the four energy level active elements, whereas only a pulsed output has been produced in the three energy level active element.

Even though it is possible to provide a continuous wave output from the lasers utilizing the four energy level active elements it has been found that the pumping power is still sufficiently great so as to prevent continuous wave oscillations for an indefinite length of time. The prior art active elements of the lasers have taken the form of the Fabry-Perot interferometer and are known as the Fabry-Perot resonators in the lasers. The Fabry-Perot resonators have been shown and described in the above mentioned U.S. Patent 2,929,922 and in copending and commonly assigned U.S. patent applications Serial No. 73,878, now U.S. Patent No. 3,130,254, and No. 75,296 filed on December 5, 1960, and December 12, 1960, respectively. In the Fabry-Perot resonator opposite ends of the active element are made parallel to each other and a reflective coating is applied thereto so as to repeatedly reflect the rays in the resonator between the two ends thereof. The reflective coating on at least one of the two ends has a small percentage of transmissivity so as to provide an output for the laser. The reflecting surface in the Fabry-Perot resonator has been provided by either applying a silver film to each of the opposite ends surfaces of the resonator or by using multiple dielectric layers. A high degree of parallelism is required between the opposite or reflective ends of the resonator so that the rays being reflected between these ends will not walk off, that is, will not have a component normal to the axis of the crystal passing through the two reflective ends, and thus pass through the surfaces of the resonators connecting the reflecting ends rather than passing through the output end of the crystal. Furthermore, it is known that even when utilizing the best techniques for applying silver film or multiple dielectric layers a portion of the rays are absorbed rather than reflected by these reflecting surfaces. Thus, the efficiency of the laser is impaired.

In a copending commonly assigned application Serial No. 144,187 filed by P. P. Sorokin on October 10, 1961, and entitled "Lasers" there is described a laser having an active element which does not require reflective coatings to be applied thereto between which oscillations are produced for the generation of coherent light. In this latter application the laser includes an active element which has an index of refraction and a geometrical configuration such that rays are internally reflected therein by striking successive faces at angles greater than the critical angle until they arrive at an output area at a predetermined location on the surface of the active element. In one embodiment of an active element described in the latter application the active element is made of a calcium fluoride crystal doped with trivalent uranium and the geometrical configuration thereof is a rectangular prism having ends in the form of a square and the faces in the form of rectangles. The index of refraction of the calcium fluoride crystal is equal to 1.435, thus providing a critical angle of approximately 44 degrees so that rays striking the faces of the rectangular prism at angles greater than 44 degrees are totally reflected. It can be seen that the active elements described in the latter application are restricted to prisms having the proper relationship between the index of refraction and the geometrical configuration thereof in order to operate at or near optimum output values.

It is an object of this invention to provide improved lasers utilizing internal reflection techniques at curved surfaces.

Another object of this invention is to provide improved active elements for lasers by utilizing internal reflection techniques at curved surfaces of the active element.

A further object of this invention is to provide improved solid state lasers utilizing internal reflection techniques at curved surfaces.

Yet a further object of this invention is to provide efficient lasers employing internal reflection techniques which can be relatively simply constructed.

Yet another object of this invention is to provide cylindrical active elements for lasers which do not require silver or multiple dielectric layers.

Still a further object of this invention is to provide an improved active element for lasers which damps all modes except a selected few which are highly favored for laser operation.

Still another object of this invention is to provide circular active elements for lasers which utilize internal reflections and which operate at optimum output values for materials having any value of index of refraction.

In accordance with the present invention an optical maser or laser is provided which includes an active element having a cylindrical outer surface and means for deriving an output from a surface of the active element which is substantially concentric to the axis of the outer surface of the active element.

An important advantage of this invention is that a laser is provided having an active element wherein total internal reflection of selected rays is produced which has a geometrical configuration such that it will operate at optimum values regardless of the value of the index of refraction of the active element.

An important feature of the laser of the present invention is that it provides an active element of great precision for a laser which may be easily constructed as, for example, by lathe-like machining.

The foregoing and other objects, features and advantages of the invention will be apparent from the following more particular description of preferred embodiments of the invention, as illustrated in the accompanying drawings.

Figure 6:
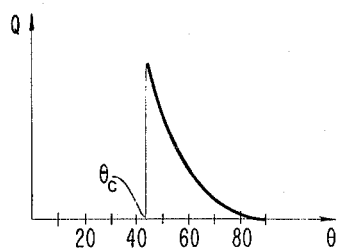
Figure 7:
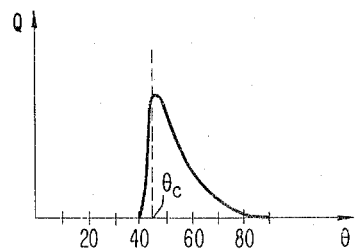
Figure 8:
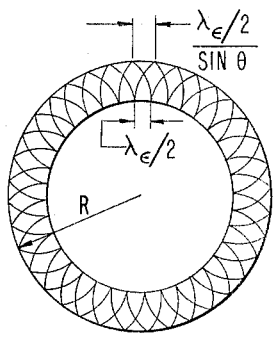
Figure 9:
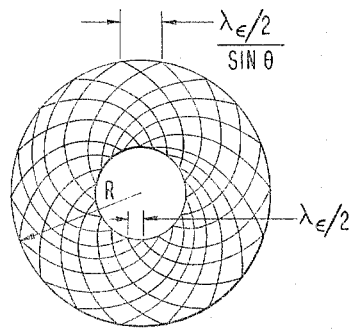
Figure 10A:
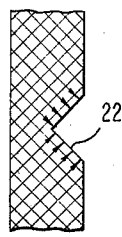
Figure 13:
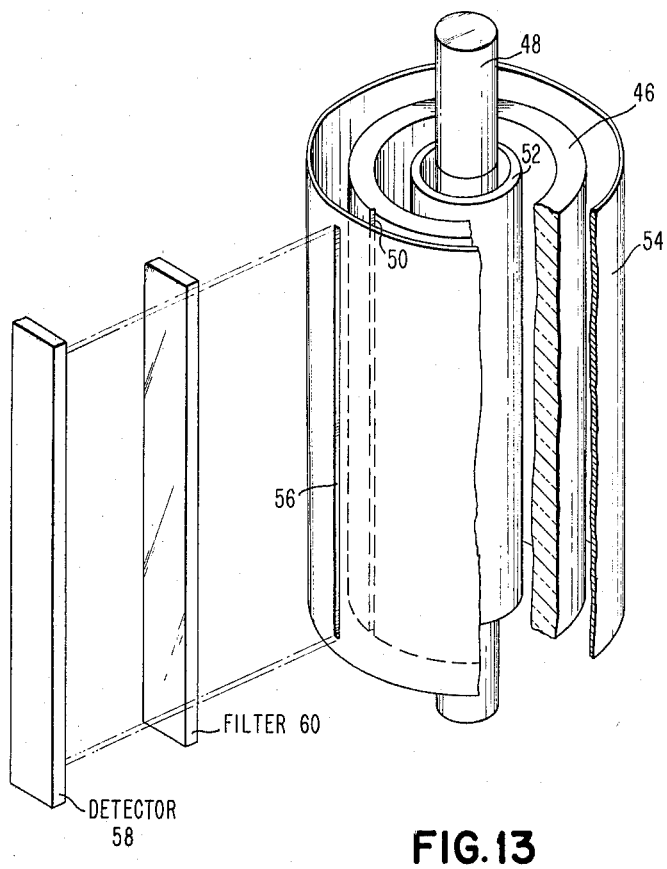
Figure 12:
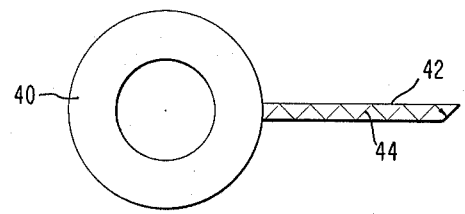
Figure 12A:
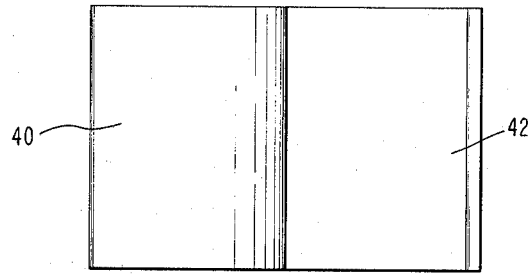
Figure 11:
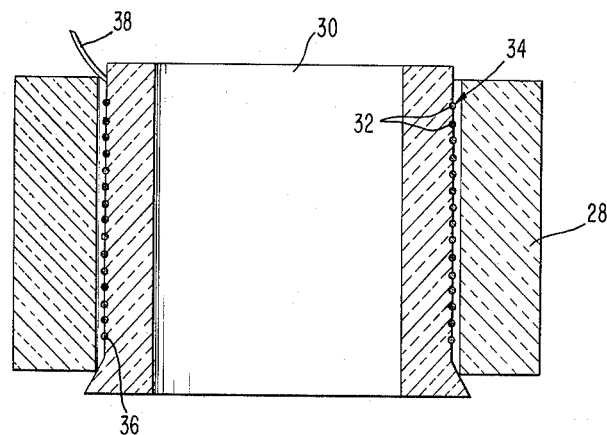

In the drawings:

FIG. 1 shows one embodiment of the active element of the laser of the present invention, FIG. 1a indicates paths of rays in a plane perpendicular to the longitudinal axis of the active element shown in FIG. 1, FIG. 2 shows another embodiment of the active element of the laser of the present invention, FIG. 2a shows the plan view of the laser illustrated in FIG. 2, FIG. 2b shows a longitudinal cross sectional view of the active element of the laser illustrated in FIG. 2, FIG. 3 indicates the path of rays in a plane perpendicular to the longitudinal axis of the type of active element illustrated in FIG. 2 wherein the material of the active element has a given index of refraction, FIG. 4 indicates the path of the rays in a manner similar to that illustrated in FIG. 3 but where the material of the active element has a smaller index of refraction, FIG. 5 is a graph made by plotting the Q of an active element of the invention against angles of reflection, FIGS. 6 and 7 are graphs indicating the Q values of a given active element of the invention for various angles of reflection, FIG. 8 indicates the wave fronts in a calicum fluoride active element having the type of geometry of the active element illustrated in FIG. 2, FIG. 9 indicates the wave fronts in a rutile active element having the type of geometry of the active element illustrated in FIG. 2, FIGS. 10a, b and c illustrate means for extracting a portion of the coherent radiation from an active element of the present invention, FIG. 11 shows an arrangement wherein coherent radiation from an active element is coupled into an optical fiber, FIGS. 12 and 12a illustrate an active element utilizing an optical output coupling plate for deriving therefrom coherent energy, and FIG. 13 illustrates a a laser of the present invention wherein a pump source is disposed within the active element.

Referring to the drawings in more detail, FIG. 1 shows an embodiment of an active element 10 which may be referred to as the resonator of a laser and which in solid state lasers is a crystalline medium having a doping suitable for laser action as described hereinabove. The active element 10 is of a cylindrical configuration having longitudinal axis Z, a radius R, a length L, an outer cylindrical surface 12 and end surfaces 14 which are preferably substantially parallel to each other. Pumping power which may be applied to one or both of the end surfaces is indicated by arrows 16. The dielectric constant of the active element may be referred to as $\epsilon$ and the dielectric constant of the material surrounding the active element, for example, air, may be referred to as $\epsilon_0$. The dimensions of L and R have no restrictions except that there should be no tapering of the active element in the Z direction and the active element should be highly circular in the R–$\phi$ plane which is the plane perpendicular to the Z axis of the crystal. The outer surface 12 of the active element 10 should be highly polished to provide an optically smooth surface, that is, the surface irregularities should be less than the optical wave length, $\lambda$. When pumping power 16 is applied to the active element 10 rays produced in the active element are internally reflected in the R–φ plane by the outer cylindrical surface 12 to an extent depending upon the angle at which these rays strike the outer surface 12 of the active element. FIG. 1a shows an R–φ plane of the active element 12 of FIG. 1 in which there is indicated the path of a ray at an angle $\theta_1$ striking point 18 on the outer surface of the active element 10. The critical angle of a given material of which the active element 10 may be made is indicated at $\theta_c$. There is also indicated in FIG. 1a the path of a ray at an angle $\theta_2$ also striking the point 18 at the outer surface of the active element 10. The angle $\theta_1$ is shown to be greater than the critical angle $\theta_c$ of the given material and the angle $\theta_2$ is less than $\theta_c$. Accordingly, it can be seen that the rays striking the point 18 at an angle greater than $\theta_c$, for example, at the angle $\theta_1$ will be totally reflected and no energy will pass out of the active element, whereas the rays striking point 18 at an angle which is less than the critical angle, for example, at the angle $\theta_2$ will be partially refracted out of the active element 10.

The index of refraction of the active element 10 is $$\eta = \sqrt{\frac{\epsilon}{\epsilon_0}} = \frac{1}{\sin \theta_c}$$

Since the rays which strike the outer surface 12 of the active element 10 at an angle less than the critical angle will not be totally internally reflected these rays cannot produce modes within the active element having a high Q. On the other hand, rays which strike the outer surface 12 of the active element 10 at an angle greater than the critical angle will be totally reflected and, thus, can produce modes having relatively high Q's. It can be seen from a study of FIG. 1a that the essential portion of the cylindrical active element may be reduced to a hollow cylinder or annulus 20 as illustrated in FIGS. 2, 2a and 2b. The thickness of the annulus, that is, the distance between the outer and inner cylindrical surfaces of the active element illustrated in FIG. 2 is determined by the critical angle of the material of the active element 10.

FIG. 3 illustrates a mode which is produced in an active element when the critical angle is equal to $\theta_3$. It can be seen from FIG. 3 that a cylindrical section having a radius R sin $\theta_3$ may be removed from a solid cylindrical active element without disturbing the mode set up by the rays striking the outer surface of the active element at the angle $\theta_3$.

In FIG. 4 there is shown a section through an active element in which a mode is set up by rays striking the outer surface of the active element at an angle $\theta_4$ which angle is greater than the angle $\theta_3$. It can be seen that the cylindrical section which may be removed from a solid cylindrical active element is greater than the section removed from the active element illustrated in FIG. 3. Accordingly, the annular active element in FIG. 4 is not as thick as the annular active element in FIG. 3, assuming each of the outer diameters of the active elements to be equal to 2R. The maximum number of modes a cube with unit volume can support over a frequency interval $\Delta f$ may be determined by the equation $N = 8\pi^2 f^2 \Delta f c^{-3}$, where $f$ is the optical or operating frequency and $c$ is the speed of light in the cube. There are a large number of modes that satisfy the boundary conditions for a structure of practical size at optical frequencies. The power loss per unit volume and the intensity of the electromagnetic energy of optical waves will be different for these many modes. The ratio of these two, that is, the Q belonging to some particular modes will be the determining factor for the mode selection. In laser operation it is necessary to produce in the active element only a few and preferably one mode. In the geometrical configuration of the active element of the present invention the walk off modes, that is, those with propagating vectors having a component in the Z direction are not utilized to produce resonance in the active element since these will have a low Q and thus a high power loss. Accordingly, the only modes of interest in the structure of the present invention are the modes set up in the R–φ planes, that is, the planes perpendicular to the Z direction of the active element. In the R–φ plane the angle of incidence uniquely determines the mode of operation, that is, one particular mode has only one distinct angle of incidence and only one mode can be set up with one incident angle. This angle may be referred to as $\theta$. Modes which have incidence angles smaller than the critical angle $\theta_c$ which is equal to $$\sin^{-1} \sqrt{\frac{\epsilon_0}{\epsilon}}$$

may also be eliminated since for these modes there is a comparatively large power loss, only a part of the power being reflected from the outer surface of the active element as explained hereinabove.

Of interest then in laser operations wherein the laser has an active element of a cylindrical configuration in accordance with the present invention are the modes which are produced by rays having incident angles between the critical angle $\theta_c$ and 90 degrees. The Q of these modes is a function of $\theta$ and the value of Q may be expressed as $$Q = \frac{\omega W}{P_\Sigma} = \frac{\omega W}{P_s + P_v}$$

where $\omega$ is the angular frequency of operation, that is, $2\pi f$, W is the optical electromagnetic energy stored in the volume, $P_s$ is the power loss due to the active element surface imperfections and $P_v$ is the power absorbed by atoms in the volume. Q is thus proportional to the amount of electromagnetic energy stored in the volume of the active element when one particular mode is observed at a time. The electromagnetic energy stored in a volume is proportional to the sum of the equiphase plane areas times the amplitude squared. Also, the Q mode is proportional to the length of an equiphase line in the R–φ plane. The length of one of these equiphase lines is $$L(\theta) = \frac{R}{2} \cot \theta \cos \theta$$

On the other hand, Q is inversely proportional to the power loss. A portion of this power loss $P_v$ is proportional to the volume and the volume of a mode may be considered as being proportional to $\cos^2 \theta$. The other portion of the lost power $P_s$ is due to the active element surface imperfections, that is, lack of surface smoothness, scratches and other deformations. If $P_s$ is larger than $P_v$ then Q will be proportional to cot $\theta$ cos $\theta$. If on the other hand $P_s$ is much smaller than $P_v$ then the Q is proportional to $1/\sin \theta$. Curves representing these two functions are shown in FIG. 5 of the drawing. Since, as stated hereinabove, the only Q's of interest are those between the critical angle $\theta_c$ and 90 degrees there is shown in FIG. 6 a graph of the Q of an active element having a critical angle of approximately 44 degrees, for example, that of calcium fluoride. The critical angle is, of course, a function of frequency so the terminating line at the critical angle is only vertical for one operating frequency at a time. The active atoms in the laser, however, give their energy into a frequency band with finite bandwidth which will modify the Q curve to a slight extent as indicated in FIG. 7 of the drawing. Thus, it can be seen that the mode with the critical angle $\theta_c$ or an angle very close to this critical angle, which as indicated in FIG. 7 of the drawing is the angle corresponding to the peak value of Q, i.e. a value slightly higher than the critical angle $\theta_c$, will in general be built up to produce stimulated emission in the laser.

It should be understood that there is a boundary condition at the surface of the cylindrical active element of the present invention which may provide an operating angle which is larger than the critical angle $\theta_c$. This boundary condition is $$\frac{n\lambda_s}{2} = 2\pi R \quad (1)$$

where $n$ is an integer, $\lambda_s$ is the surface wavelength equal to $\lambda_\epsilon/\sin\theta$, $\lambda_\epsilon$ being equal to the wavelength in the material of the active element which in turn is equal $$\lambda_0 \sqrt{\frac{\epsilon_0}{\epsilon}}$$

and R is the radius of the cylindrical active element. The angle $\theta$ which satisfies Equation 1 and which is closest to the critical angle $\theta_c$ will be the operating angle which determines the mode of operation of the active element. This operating angle will not deviate from the critical angle $\theta_c$ more than a few seconds.

In FIGS. 8 and 9 there are shown mode patterns in the form of equiphase lines in the R–$\phi$ plane for two cylindrical active elements having the same outer radius but with the active element indicated in FIG. 8 being made of calcium fluoride and thus having an index of refraction equal to 1.43 and the active element in FIG. 9 being made of rutile and thus having an index of refraction equal to 2.82. The lines between the inner and outer surfaces of the cylindrical active elements indicate the equiphase lines in the active elements for the frequency of operation of the respective active elements. As indicated in FIGS. 8 and 9 the spacing between successive wave fronts at the outer surface of the active element is equal to $$\frac{\lambda_\epsilon/2}{\sin\theta}$$

and the inner surface is equal to $\lambda_\epsilon/2$, where $\lambda_\epsilon$ is equal to $$\lambda_0 \sqrt{\frac{\epsilon_0}{\epsilon}}$$

and $\sin\theta$ is equal to $$\sqrt{\frac{\epsilon_0}{\epsilon}}$$

in both the calcium fluoride and the rutile active elements.

Figure 10B:
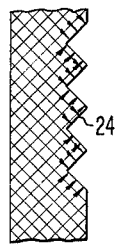
Figure 10C:
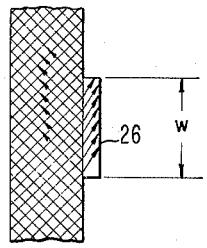

The structure of the active element of the laser of the present invention and the modes set up in the structure have been described hereinabove but unless some provision is made to couple a portion of the produced radiation out of the active element the optical electromagnetic energy will be confined within the surface of the cylinder. There is shown in FIGS. 10, 11 and 12 various methods for taking energy out of the active element of the present invention. One method of extracting energy from the active element is to cut a groove in the outer surface of the cylindrical active element in a direction parallel to the Z axis of the active element. A cross section of such a groove 22 is illustrated in FIG. 10a of the drawing. Another method for extracting radiation from the active element is to make a grating 24, for example, with up to several hundred grooves, on the outer surface of the cylinder parallel to the Z axis, as indicated in FIG. 10b of the drawing. The grating if properly made would produce a very parallel beam sheet. This grating could also act as a filter narrowing down the frequency band emitted by the atomic oscillations in the active element. If desired the grooves in the active elements may be filled with a low loss material having any suitable dielectric constant. The intensity of the output radiation can be controlled by applying to the outer surface of the active element a strip of material having an intermediate dielectric constant $\epsilon'$ to suit the desired requirements where the dielectric constant of the laser material is $\epsilon$ and that of the surrounding material, for example, air is $\epsilon_0$. The strip of material is applied to the outer surface of the active element in a direction parallel to the Z axis of the active element. A cross section of the strip of material 26 and a portion of the active element is shown in FIG. 10c of the drawing. The intensity of the radiation is, of course, dependent upon the width $w$ of the strip of material having the dielectric constant $\epsilon'$ since the loaded Q value of the active element will decrease when the width of this material increases.

FIG. 11 shows a laser having an active element in accordance with the present invention utilizing an optical fiber for coupling optical energy out of the active element. In FIG. 11 there is shown the active element 28 in the form of a hollow cylinder. Disposed concentrically within the active element 28 is a cylindrical support member 30 having a groove 32 in the outer surface thereof extending in the form of a helix from the upper portion of the support member 30 to the lower portion thereof. The support member 30 is made of a low loss dielectric material, for example, glass, with a dielectric constant somewhat less than the dielectric constant of the active element 28. The lower portion of the support member 30 is tapered for the purpose of aiding in the proper alignment of the support member 30 with respect to the active element 28. Disposed in the groove 32 is an optical fiber 34 having a diameter in the order of the optical wavelength. The pitch of the groove is such, that two adjacent turns have negligible intercoupling. The distance between the inner surface of the active element 28 and the optical fiber 34 should be in the order of a wavelength. The optical fiber may be tapered at the lower end thereof 36 so as to provide a lossless reflection from that end, thus substantially all of the coherent radiation derived from the active element 28 will pass through the upper end 38 of the optical fiber 34. If an output is desired from both ends of the optical fiber an end thereof should not be tapered. The index of refraction of the optical fiber 34 relative to that of the active element 28 should be considerably higher. The space between the active element 28 and the support member 30 is filled in with a material having an index of refraction similar to that of the support member 30.

In FIGS. 12 and 12a there is shown another method that may be used for extracting the coherent radiation from an active element of the laser of the present invention. In FIG. 12 there is shown a plan view of an active element 40 and an optical coupling plate 42 butting at one end thereof the active element 40. The plate 42 is disposed in a plane passing through the Z-axis of the active element 40. The end of the optical coupling plate 42 opposite the end butting the active element 40 is beveled, for example, a 45° angle, so as to permit radiation to readily pass out of the plate in a desired form. The path of one of the rays passing through the plate is indicated at 44 in FIG. 12 of the drawing. FIG. 12a illustrates the active element 40 and coupling plate 42 in an elevational view.

In FIG. 13 there is shown an embodiment of a laser of the present invention utilizing a pumping source disposed within the active element of the laser. The laser has an active element 46 in the form of a hollow cylinder or annulus and a pumping source 48, which may be a high intensity flash tube or a continuous wave discharge tube, disposed concentrically within the active element 46. A groove 50 is provided at the outer surface of the active element 46 along a line parallel to the Z-axis of the active element 46 for permitting the optical radiation in the active element 46 to be extracted therefrom. Interposed between the pump source 48 and the active element 46 is a filter 52 suitable for filtering out any undesirable radiation from the pumping source 48 before it strikes the active element 46. Surrounding the active element 46 and disposed concentrically therewith is a shell 54 having a highly reflecting interior surface for redirecting into the active element 46 the pumping radiation which may have passed through the active element 46 from source 48. A slit 56 disposed parallel to the Z-axis of the active element 46 is provided in the shell 54 and disposed with respect to the groove 50 in the active element 46 so as to permit the output radiation from groove 50 to pass through the shell 54. The output radiation is detected by positioning a suitable detector 58 in the path of the output radiation. A filter 60 for filtering out undesired background frequencies is interposed between the detector 58 and the groove 50.

The specific active elements mentioned hereinabove have been solid state elements or crystals. However, it should be understood that the active elements of the present invention are not limited to solid state elements or crystals since it is known that liquids respond to the laws of optics in the same manner as do solids, therefore, liquid active elements could also take the forms of the active elements of the present invention by placing suitable liquids in proper containers having appropriate indices of refraction.

A number of known active elements in lasers must be operated at extremely low temperatures in order to provide coherent radiation. It should also be understood that the active elements of the present invention may also be operated at these low temperatures, for example, by simply securing one end of the cylindrical active element to a cold finger of a dewar in a manner similar to that described in the above mentioned U.S. patent applications.

While the invention has been particularly shown and described with reference to preferred embodiments thereof, it will be understood by those skilled in the art that various changes in form and details may be made therein without departing from the spirit and scope of the invention.

What is claimed is:

1. A laser comprising a cylindrical active element including a doping material having a pair of energy levels, means for energizing said active element to produce coherent radiation therein at a frequency defined by said energy levels, said active element having an optically smooth cylindrical side wall parallel to the longitudinal axis of said element for repeatedly totally internally reflecting in a plane transverse to the longitudinal axis the coherent radiation produced therein, and means for extracting a portion of said repeatedly reflected radiation from said active element.

2. A laser comprising an active element including a doping material for providing stimulated emission of radiations and having a cylindrical form with an optically smooth cylindrical side wall parallel to the longitudinal axis of said element, means for applying pumping power to said active element, the degree of smoothness of said side wall and the intensity of said pumping power being sufficient to produce stimulated emission of radiations in a plane perpendicular to said longitudinal axis of said active element which are repeatedly totally internally reflected at said side wall and means for extracting a portion of said radiations from said active element.

3. A laser comprising an active element including a doping material capable of providing a population inversion for generating coherent radiations and having a hollow cylindrical configuration and an optically smooth outer cylindrical surface parallel to the axis of said element, means for applying pumping power to said active element to produce said coherent radiations therein, said radiations being repeatedly totally internally reflected at said cylindrical surface, and means for directing a portion of said coherent radiations out of said active element.

4. A laser comprising a cylindrical active element capable of providing stimulated emission and having outer and inner concentric right cylindrical surfaces parallel to the axis of said element, said outer surface being optically smooth, means for applying pumping power to said active element to produce coherent radiations therein, said radiations being repeatedly totally internally reflected at said outer cylindrical surface, and means for directing a portion of said coherent radiations through one of said surfaces.

References Cited by the Examiner

UNITED STATES PATENTS

| | | | |
|---|---|---|---|
| 2,671,376 | 3/1954 | Merton | 88—1 |
| 2,929,922 | 3/1960 | Schawlow et al. | 330—4 |
| 3,102,920 | 9/1963 | Sirons | 331—94.5 |
| 3,130,254 | 4/1964 | Sorokin et al. | 331—94.5 |
| 3,140,451 | 7/1964 | Fox | 331—94.5 |

OTHER REFERENCES

Snitzer: "Journal of Applied Physics," January 1961, pages 36–39.

JEWELL H. PEDERSEN, *Primary Examiner.*

ROY LAKE, *Examiner.*